United States Patent [19]

Paxton

[11] 4,159,691

[45] Jul. 3, 1979

[54] MARINE CRAFT EMPLOYING BOW-WAVE LIFT

[76] Inventor: Roland K. Paxton, 13, Calbourne Rd., Carisbrooke, Isle of Wight, England

[21] Appl. No.: 814,821

[22] Filed: Jul. 12, 1977

[30] Foreign Application Priority Data

Jul. 15, 1976 [GB] United Kingdom ............... 29448/76

[51] Int. Cl.² ............................................... B63B 1/18
[52] U.S. Cl. ........................................ 114/290; 114/56
[58] Field of Search .............. 114/56, 67 A, 288–290; 9/6 P, 6 W

[56] References Cited

U.S. PATENT DOCUMENTS

| | | | |
|---|---|---|---|
| 928,579 | 7/1909 | Apel | 114/67 A |
| 3,203,389 | 8/1965 | Cale | 114/289 |
| 3,376,840 | 4/1968 | Zaphiriou et al. | 114/290 |
| 3,796,177 | 3/1974 | Szpytman | 114/290 |

*Primary Examiner*—Trygve M. Blix
*Assistant Examiner*—Sherman D. Basinger
*Attorney, Agent, or Firm*—Steele, Gould & Fried

[57] ABSTRACT

A marine craft has one or more hulls, each hull being provided with a pair of downwardly-depending walls disposed symmetrically on each side of the longitudinal axis of the hull to define a pair of laterally-spaced tunnels therewith, and so that, in operation of the craft, the walls extend into the water over which the craft travels. The walls are shaped so as to divert and accelerate bow wave water sternwards, through the tunnels, whereby a dynamic lift force is applied to the hull.

10 Claims, 9 Drawing Figures

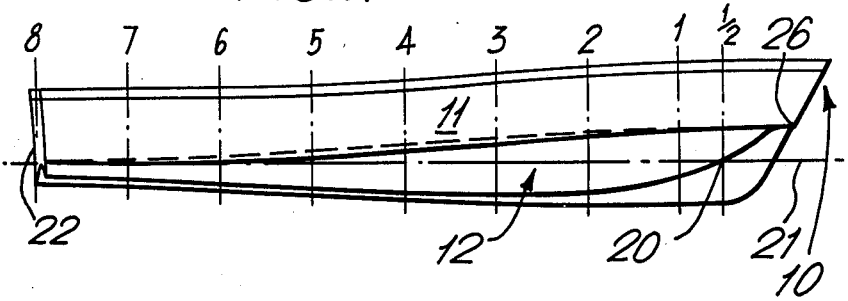
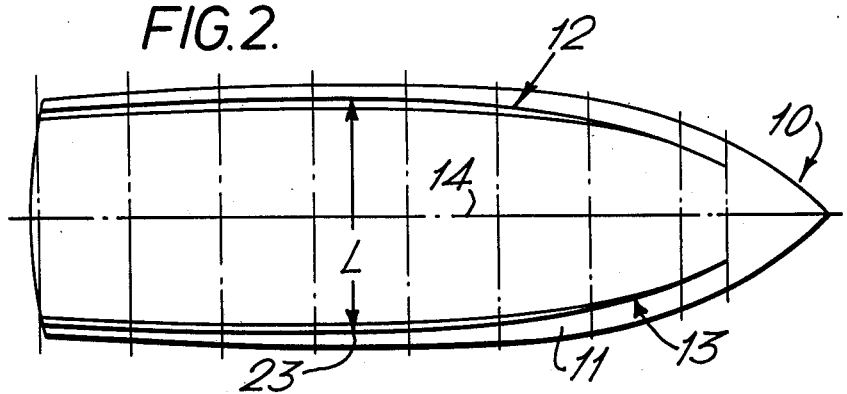
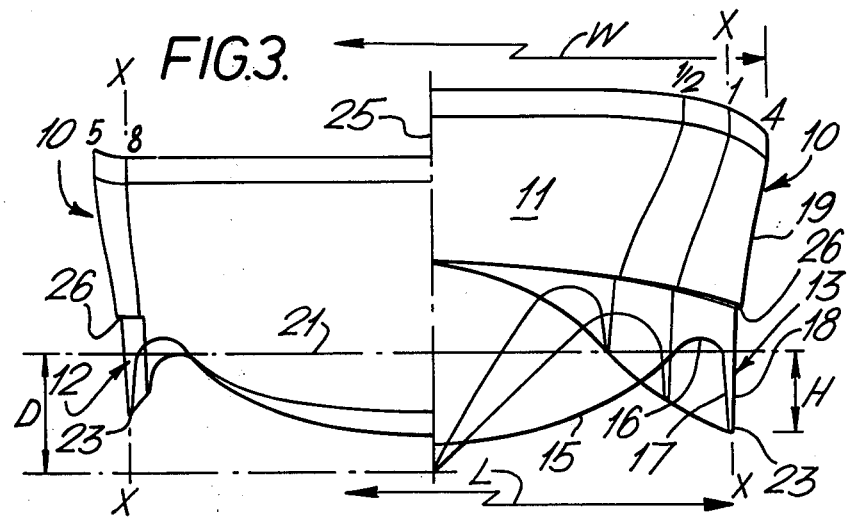

4,159,691

MARINE CRAFT EMPLOYING BOW-WAVE LIFT

BACKGROUND OF THE INVENTION

This invention relates to marine craft, and is concerned with marine craft having at least one hull. It will be appreciated therefore that the invention is concerned with catamarans and trimarans as well as with single-hull marine craft.

When a marine craft is travelling through water, its hull generates bow waves. The energy expended in producing these bow waves detracts from the motive power, and therefore reduces the propulsion efficiency of the craft.

The present invention seeks to make use of bow waves in order to improve the performance of marine craft.

SUMMARY OF THE INVENTION

According to one aspect of the invention, a marine craft having at least one hull is provided with a pair of downwardly-depending walls disposed symmetrically on each side of the longitudinal axis of the hull so that, in operation of the craft, the walls extend into the water over which the craft travels, the walls being shaped so as to divert bow wave water sternwards and between the walls whereby a dynamic lift force is applied to the hull.

The walls are preferably shaped so that, for any vertical section shown in body plan, the lateral distance between the bottoms of the walls corresponds to between 70% and 100% (inclusive) of the hull width at that section.

The walls preferably extend from the design water line at the bow of the hull, to the stern thereof.

For any vertical section shown in body plan, each wall may depend downwardly for up to twice the design draft of the hull of the craft.

The walls may be formed so that the outer surface of each wall is disposed at an angle of up to 10° C. either side of a vertical plane parallel to another vertical plane which contains the longitudinal axis of the hull.

Existing marine craft may be modified to become marine craft in accordance with the invention.

According to another aspect of the invention, a method of manufacturing a marine craft having at least one hull includes the step of providing the craft with a pair of walls, which, in operation of the craft, extend into the water over which the craft travels, the walls being shaped so as to divert bow wave water sternwards and between the walls whereby a dynamic lift force is applied to the hull.

As used herein, the term "manufacturing" is intended to include "modifying".

The walls may be made integral with the hull.

According to yet another aspect of the invention, a method of operating a marine craft having at least one hull, includes the step of diverting bow wave water sternwards whereby a dynamic lift force is applied to the hull.

The forward edge of each wall may be faired into the bow of the hull and the walls may be associated with other components carried by the hull, for example, anti-spray rails.

BRIEF DESCRIPTION OF THE DRAWINGS

The various aspects of the invention will now be described, by way of example only, with reference to the accompanying drawings, wherein:

FIG. 1 is a profile or side elevation of a single-hull marine craft according to a first embodiment of the invention, FIG. 2 is an inverted plan view of the craft shown in FIG. 1, FIG. 3 is a body plan or end elevation of the hull shown in FIG. 1 but to an enlarged scale, with only five of the sections drawn, for reasons of clarity.

In the figures, reference numerals $\frac{1}{2}$, 1, 2, 3, 4, 5, 6, 7 and 8, and similarly $\frac{1}{2}a$, $\frac{1}{2}e$ etc., refer to the vertical sections of the craft. Furthermore, in the figures, like reference numerals refer to like components.

DETAILED DESCRIPTION OF THE PREFERRED EMBODIMENTS

Figure 4:
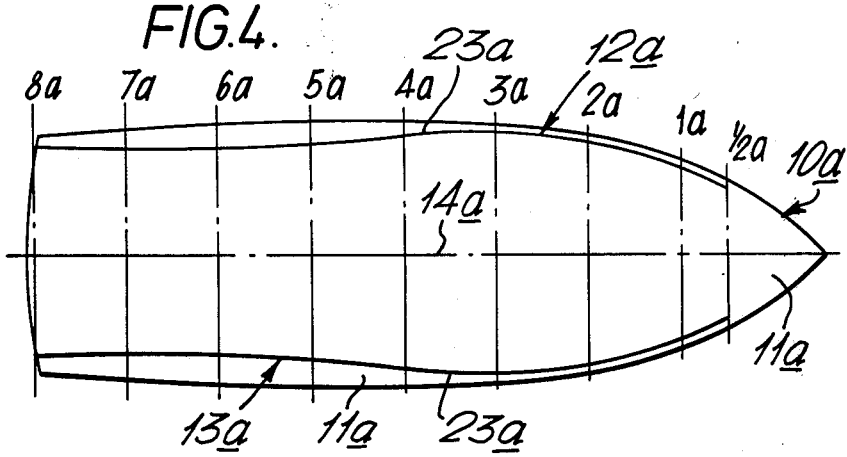
FIG. 4 is an inverted plan of a single-hull marine craft according to a modified version of the invention.

With reference to FIGS. 1, 2 and 3, a marine craft 10 having a single hull 11, is provided with a pair of downwardly-depending walls 12, 13 of rigid construction and of identical form, disposed symmetrically on each side of the (central) longitudinal axis 14 of the hull, so that, in operation of the craft, the walls 12, 13 extend into the water over which the craft travels. As explained hereinafter, the walls 12, 13 are shaped so as to divert bow wave water sternwards and between the walls whereby a dynamic lift force is applied to the hull 11.

It will be noted that the walls 12, 13 are of relatively thin (lateral) cross-section, relative that is, to the (lateral) cross-section of the hull 11.

The craft 10 is of G.R.P. (glass-reinforced plastics) and is manufactured by any standard laying-up method. The craft 10 is moulded so that from the vertical plane 25 (FIG. 3) containing the longitudinal axis 14 of the hull 11, the underside of the hull has, (including a wall 12 or 13), an innermost part 15 which rises outwardly and upwardly, then an intermediate part 16, which curves downwardly to join with a downwardly directed part 17, and finally an upwardly directed part 18 which merges with the hull side 19. It will be appreciated that reference numerals 15 to 19 are applicable to all the vertical sections, although, for clarity, in FIG. 3 they are shown only for section 4.

The downwardly directed part 17 and the upwardly directed part 18 form the wall 13 which depends downwardly from the hull 11. Any narrow cavities occuring within the wall 13 (and similarly within the wall 12), are filled with closed cell foam.

Each wall 12 and 13 starts at a point 20 (shown in (FIG. 1) for wall 12 only) adjacent the bow of the hull 11 and at the design water line 21, and extends along the hull 11 to the stern 22 thereof. The forward edge of each wall 12 and 13 is faired into the forward part of the bow at points above the design water line 21. As shown in FIG. 2, the foremost part of the walls 12, 13 are laterally spaced from the longitudinal axis 14 of the hull.

The walls 12 and 13 are curved in plan so that the lateral distance "L" between their bottoms 23, for all vertical sections shown in body plan, (FIG. 3), is from 70% to 100% (inclusive) of the hull width "W" at that section. For all vertical sections shown in body plan, each wall has a draft of (variable) distance "H" corresponding to less than the design draft "D" of the main body (hull) of the craft.

The following table relates to the craft 10 described:

| Vertical Section | Distance between wall bottoms, expressed as a percentage of the hull width at that section | Draft of the wall bottoms expressed as a percentage of the design draft |
| --- | --- | --- |
| ½ | 75% | Design Water Line (21) |
| 1 | 80% | 50% |
| 2 | 80% | 60% |
| 3 | 90% | 70% |
| 4 | 90% | 70% |
| 5 | 90% | 60% |
| 6 | 90% | 60% |
| 7 | 90% | 50% |
| 8 | 90% | 50% |

The outer surfaces of each wall 12 and 13 are disposed at an angle of up to 10° either side of a vertical plane X—X parallel to the vertical plane 25 containing the longitudinal axis 14. In the example illustrated by FIG. 3, the outer surface 18 of the wall extends downwardly and inwardly, (from the hull 11), at an angle of 3° from the plane X—X.

As shown in FIG. 2, the walls 12, 13 are shaped so that, extending sternwards, they each curve outwardly to about midway along the craft 10, i.e. to about section 5. This midway point roughly defines a bow half and stern half of the craft 10. Thereafter they continue to extend inwardly, but to a substantially less degree, and with substantially less curvature.

Furthermore, as shown in FIG. 1, the walls 12, 13 reduce in depth substantially sternwards, from about section 3.

The walls 12, 13, together with that part of the hull 11 between the walls, define rearwardly-tapering tunnels of inverted "U" form through which bow wave water, tending to move outwardly and rearwardly relative to the hull 11, is diverted and accelerated by way of the converging bow parts of the walls. With reference to FIG. 1, the tunnels have uppermost points which form a line which inclines downwardly from the bow to the stern.

The diverted water, which is "captured" and compressed by the tunnels, comprises a substantial amount of the upper parts of the bow waves, and, in flowing sternwards beneath the hull 11, applies a dynamic lift force to the hull. This lift force tends to reduce the wetted area of the craft 10 and thus improves the performance thereof.

Furthermore, diverting and capturing the bow wave water tends to reduce the height of the bow waves and also reduces the generation of spray at the tops of the bow waves.

Tests made on models indicate that the invention can result in the speed of a marine craft being increased by at least 20%.

In addition to providing a marine craft of increased performance, the walls 12, 13 tend to provide a craft with substantially increased stability in yaw and roll. Where the marine craft is provided with a keel, the size of the keel can be reduced.

The hull 11 carries anti-spray rails 26 which, in cooperation with the walls 12 and 13 assist in reducing spray to make a dryer craft as it operates over water.

The hull 11 of the marine craft 10 may be made from any of the materials used in ship and boat construction, i.e. not only G.R.P. but also reinforced concrete, wood, steel and aluminium.

For a hull 11 made of materials which are moulded, that is of G.R.P. or reinforced concrete, the moulds are preferably formed so as to produce walls 12 and 13 which are integral with the hull 11.

If the hull 11 is made of steel or aluminium, the walls 12, 13 may also be made of steel or aluminium respectively and may be flanged or bent along their upper edges for attachment to the frames or similar structural mambers of the hull.

Suitable metal walls may similarly be provided for a wooden hull.

Little or no buoyancy is provided by the walls 12, 13, which may be made with a minimal thickness consistent with having sufficient strength both inherently and in their attachment to the hull.

FIG. 4 illustrates a second embodiment of the invention. In this embodiment, the marine craft 10a has the walls 12a, 13a arranged so that their bottoms 23a form, in plan, compound curves symmetrical about the longitudinal center line 14a. Each wall curves (sternwards) at first outwardly and then inwardly, to about section 5a, and finally outwardly once again.

Figure 5:
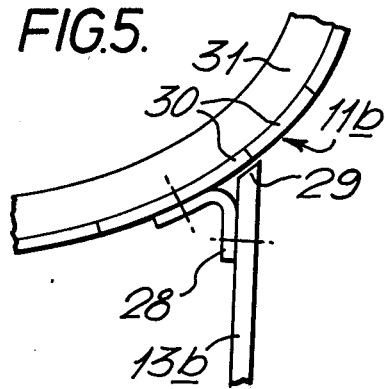
FIGS. 5, 6 and 7 are fragmentary views which illustrate, respectively, first, second and third methods of attaching non-wooden walls to wooden hulls.

FIG. 5 illustrates a final method of securing a metal wall 13b to a wooden hull 11b. The wall 13b comprises a metal plate with one elongated flange (or a series of short flanges) 28 fixed near its upper edge 29 by welding, riveting or the like. The upper edge 29 is chamferred or shaped to fit against the planking 30 of the wooden hull. The flange 28 is fixed to the hull through the planking 30 and the frame 31 by any suitable wooden boat construction methods.

Figure 6:
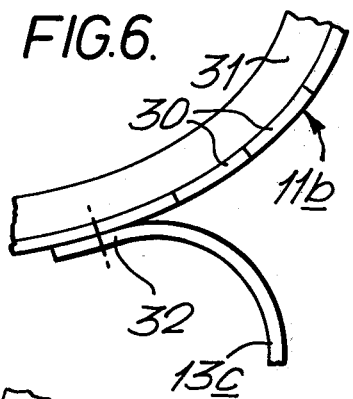

FIG. 6 illustrates a second method of securing a metal wall to a wooden hull. Here the upper edge 32 of an elongated metal plate forming a wall 13c is curved to match the planking 30. The metal plate is fixed directly to the hull through the frame 31 and planking 30.

Figure 7:
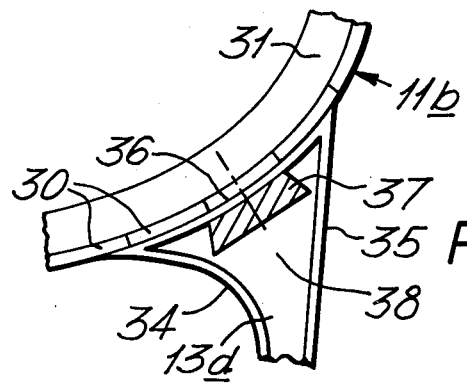

In another method of construction as illustrated by FIG. 7, a wall 13d is moulded in G.R.P. as a separate unit, the upper surface being shaped to match the hull 11b to which it is to be fitted. The lay-up of the moulding produces the inner surface 34, the outer surface 35 and the upper surface 36. A stiffening member 37 is embedded in the moulding and forms the means by which the wall is attached to the hull. The space 38 within the wall is filled with closed cell foam.

The wall constructions and methods of attachment illustrated in FIGS. 5, 6 and 7 are suitable for use with metal hulls as well as for those constructed of wood.

Figure 8:
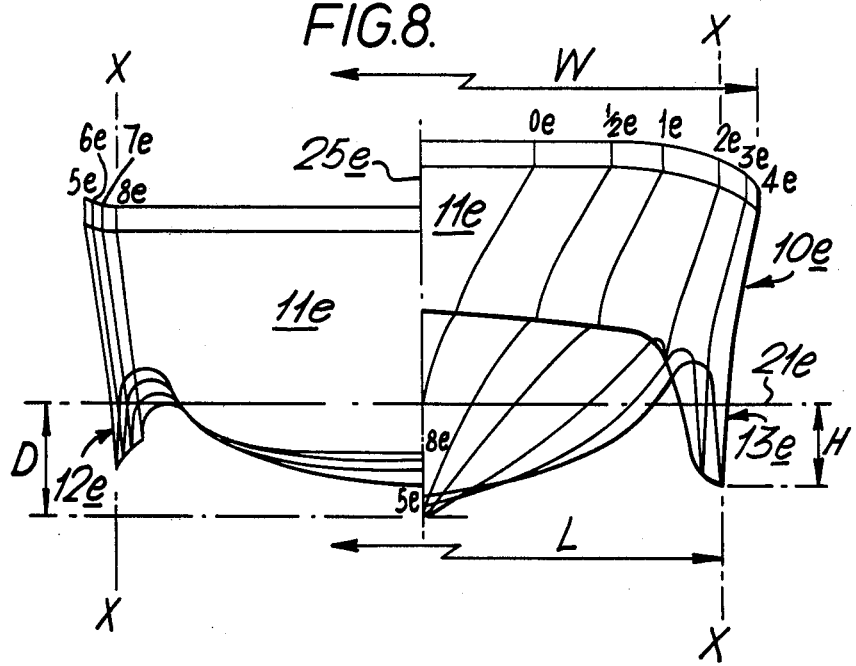
FIG. 8 is a body plan similar to that shown by FIG. 3, but of another modified marine craft.

FIG. 8 illustrates a modified marine craft 10e which may make use of any of the methods of construction illustrated by FIGS. 5, 6 and 7.

In order to further improve the performance of a marine craft according to the invention, pressurised fluid may be introduced into the tunnels between the walls 12, 13 or 12a, 13a etc. The fluid may be a gas whereby frictional forces created by contact between the water and parts of the marine craft 10, 10a etc. are reduced. The gas may comprise exhaust gas from an internal combustion engine, for example, a propulsion engine, or it may comprise air supplied by a blower or like generator of pressurised air.

Alternatively, pressurised water may be introduced into the tunnels, so as to ensure that the tunnels are filled with water, whereby the dynamic lift forces created by diverting bow waves are increased.

Figure 9:
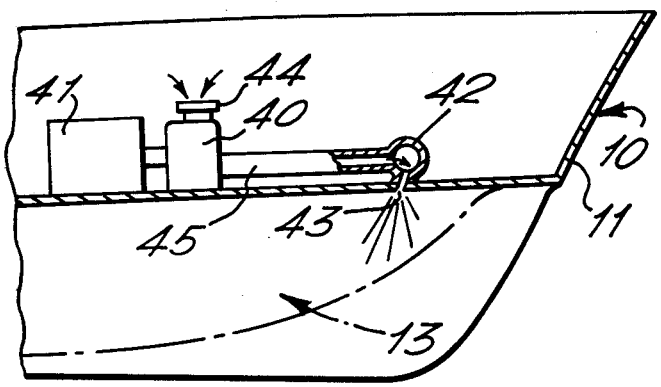
FIG. 9 is a fragmentary side view, in section, of the forward end of a marine craft, and illustrates a modification.

FIG. 9 illustrates an arrangement wherein an compressor 40 driven by a variable-speed engine 41 is used to introduce compressed air into the forward ends of the tunnels, by way of an elongated manifold 42 with a longitudinal air discharge slot 43. The compressor 40 has an atmospheric air inlet 44. An air outlet duct 45 extends between the compressor 40 and the manifold 42. The manifold 42 extends laterally between the forward ends of the walls 12, 13 whereby pressurised air is discharged from the slot 43 in curtain-like form.

To enable pressurised water to be discharged from the slot 43, the compressor 40 is replaced by a pump provided with a sea water inlet.

The marine craft 10, 10a etc. may be propelled by any suitable propulsion system, including sail. However, propulsion by one or more water-screws, driven by one or more internal combustion engines, is preferred.

I claim:

1. A marine craft comprising at least one hull, having downwardly-depending walls disposed symmetrically on each side of the longitudinal axis of the hull, so that in operation of the craft, the walls extend into the water over which the craft travels, said craft having a form defining bow and stern halves wherein, starting from a vertical plane containing the longitudinal axis of the hull and extending in a lateral direction:
   (a) with respect to the bow half of the craft, the underside of the hull has symmetrical innermost parts which rise outwardly and upwardly, then symmetrical intermediate parts which curve downwardly to merge with the walls, said innermost parts gradually increasing in outward inclination as they extend sternwards;
   (b) with respect to the stern half of the craft, the underside of the hull has symmetrical innermost parts which extend outwardly and upwardly, then symmetrical intermediate parts which curve downwardly to merge with the walls;
   (c) said intermediate parts of said bow and stern halves, together with the walls thereof, define tunnels of inverted "U" form and having uppermost points forming a line which inclines downwardly from the bow to the stern, through which bow-wave water tending to move outwardly and rearwardly, relative to the craft hull, is diverted and accelerated by way of converging bow parts of the walls; and,
   (d) the foremost parts of said walls are laterally spaced from said longitudinal axis of the hull.

2. A marine craft as claimed in claim 1, wherein the walls are shaped so that, for all vertical sections shown in body plan, the lateral distance between the bottoms of the walls corresponds to between 70% and 100% of the hull width at that section.

3. A marine craft as claimed in claim 1, wherein the walls extend from the design water line at the bow of the hull, to the stern thereof.

4. A marine craft as claimed in claim 1, wherein, for all vertical sections shown in body plan, each wall has a draft which is less than the draft of the hull of the craft.

5. A marine craft as claimed in claim 1, wherein the walls are formed so that the outer surface of each wall is disposed at an angle of up to 10° either side of a vertical plane parallel to another vertical plane which contains the longitudinal axis of the hull.

6. A marine craft as claimed in claim 1, wherein the walls are arranged so that their bottoms form, in plan, compound curves symmetrical about the longitudinal center line of the hull, and wherein each wall curves, in a sternwards direction, at first outwardly and then inwardly.

7. A marine craft as claimed in claim 1, wherein the walls are arranged to that their bottoms form, in plan, compound curves symmetrical about the longitudinal center line of the hull, and wherein each wall curves, in a sternwards direction, at first outwardly, then inwardly and finally outwardly once again.

8. A marine craft as claimed in claim 1, wherein each wall starts at a point adjacent the bow of the hull and at the design water line thereof, and extends along the hull to the stern thereof.

9. A marine craft as claimed in claim 1, wherein each wall is faired into the forward part of the bow at points above the design water line of the hull.

10. A marine craft as claimed in claim 1, provided with means for supplying pressurised fluid between the walls.

* * * * *